Dec. 31, 1929.  G. H. HOLTZ  1,741,938
CORN BINDER
Filed Feb. 5, 1926
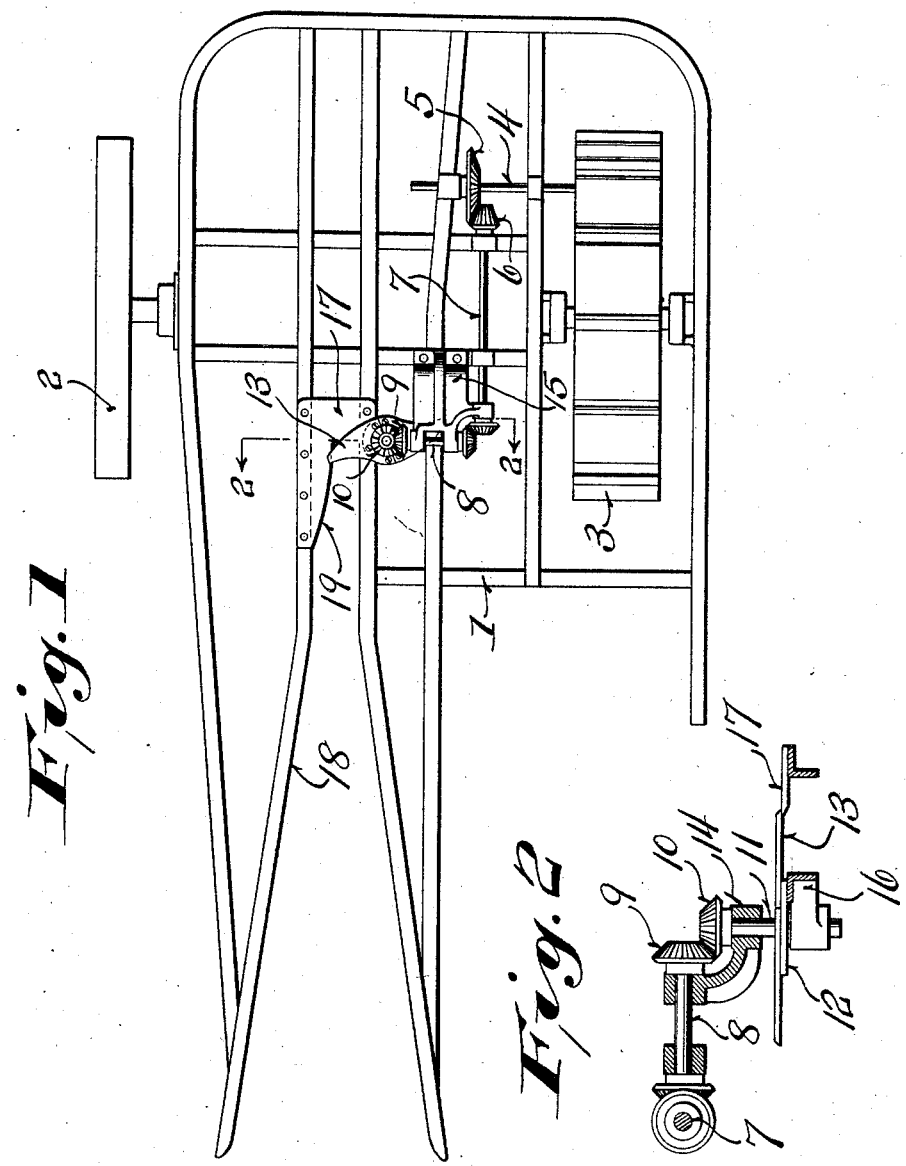

Patented Dec. 31, 1929

1,741,938

UNITED STATES PATENT OFFICE

GEORGE H. HOLTZ, OF OXFORD, WISCONSIN

CORN BINDER

Application filed February 5, 1926. Serial No. 86,185.

This invention relates to corn binders.

In corn binders as heretofore constructed, it has been the usual practice to provide a reciprocatory knife or sickle reciprocating between a pair of fixed knives, and to provide a crank shaft for oscillating the movable knife. This construction is noisy and requires a considerable amount of power and also is subjected to great wear as the knife has to be reversed at high speed and as there is a relatively sudden jar thrown upon the mechanism at each cutting stroke.

This invention is designed to overcome the above noted defects, and objects of such invention are to provide a corn binder which is so constructed that a rotary knife may be used in place of the reciprocatory knife and which is very quiet in its operation and does not throw sudden stresses upon the mechanism as is done in the case of the reciprocatory knife.

Further objects are to provide an attachment which may be applied to standard corn binders with a minimum of change.

An embodiment of the invention is shown in the accompanying drawing, in which:—

Figure 1 is a plan view of a portion of a corn binder.

Figure 2 is an enlarged sectional view on the line 2—2 of Figure 1.

Referring to the drawings, it will be seen that a frame work 1 is supported by a pair of wheels 2 and 3, the wheel 3 being the usual bull wheel.

This wheel 3 is geared or otherwise attached to a main driving shaft 4. This driving shaft carries a bevel gear 5 which meshes with a pinion 6 carried by a longitudinally extending shaft 7. The shaft 7 is connected by means of bevel gears with a short transverse jack shaft 8. This shaft 8 carries a gear 9 at its outer end which meshes with a gear 10 carried by the vertical cutter shaft 11, as most clearly shown in Figure 2.

This vertical cutter shaft is provided with a disk 12 rigid thereon, and a pair of curved knives 13 are secured by means of screws to the disk 12, as most clearly shown in Figure 1.

The vertical shaft 11 is carried by a bearing 14 formed in a bracket 15 bolted to the frame work of the machine. This bracket also furnishes bearings for the forward end of the shaft 7 and for the transverse jack shaft 8. A lower bearing 16 is provided for the vertical shaft 11 and cooperates with the disk 12 to hold the rotary knives 13 in their correct horizontal position.

The stationary knife 17 is secured to the frame work of the machine and is preferably positioned below the rotary knife, as shown in Figures 1 and 2. It is to be noted that the circular knives have a curved cutting face which gives a shearing action between the stationary knife and the cutting knives as the cutting knives are uniformly rotated through the mechanism previously described. Thus, when corn stalks are engaged between the rapidly rotating circular knives and the stationary knife 17, they are quickly severed with a minimum of effort and with a minimum of noise, the knives rotating in one direction continuously during the operation of the machine. A pair of converging guiding bars 18 are provided for leading corn stalks into position, and it is to be noted that the stationary knife 17 is provided with a transverse portion against which the stalks finally strike when they are being severed, and is also provided with a curved or tapered portion 19 cooperating with one of the guiding rods 18 of the machine.

In operation, the machine is drawn along the ground in the usual manner and the corn stalks are lead by means of converging bars 18 into position for severing by the rotary knives and the stationary knife.

It will be seen that although the rotary knives travel at a high rate of speed, that, nevertheless, their motion is uniform and no reversals are necessitated. Consequently, there is no sudden load thrown upon the mechanism, and there is, thereafter, a minimum of wear and noise attending the operation of this machine.

It will be seen further that a very simple type of mechanism has been provided which is very much superior, particularly in the features noted, to the reciprocatory type of cutter.

Although the invention has been described in considerable detail, such description is intended as illustrative rather than limiting as the invention may be variously embodied and as the scope of such invention is to be determined as claimed.

I claim:

1. The combination of a wheeled vehicle, guiding means for leading stalks into position, a stationary knife positioned adjacent said guiding means and against which said stalks are adapted to strike, said stationary knife having a convex cutting edge and a rotary knife having arms cooperating with the stationary knife, the arms of said rotary knife having convex rearwardly curved cutting faces, whereby the stalks are severed by a shearing action.

2. The combination of a corn binder having a frame and a bull wheel, a main horizontal drive shaft extending transversely of the frame and driven from said bull wheel and at a higher speed than said bull wheel, a forwardly extending shaft geared to said main drive shaft, a transverse jack shaft geared to said forwardly extending shaft, a vertical shaft geared to said jack shaft and having a disk thereon, a plurality of rotary knives secured to said disk, a bracket supporting the forward end of said forwardly extending shaft and supporting said vertical shaft and said jack shaft, a pair of guiding bars for leading stalks into position, and a stationary knife carried adjacent said guiding bars and cooperating with said rotary knives.

In testimony that I claim the foregoing I have hereunto set my hand at Oxford, in the county of Marquette and State of Wisconsin.

GEORGE H. HOLTZ.